US 6,685,087 B2

(12) United States Patent
Brown et al.

(10) Patent No.: US 6,685,087 B2
(45) Date of Patent: Feb. 3, 2004

(54) SECURITY SYSTEM FOR VALIDATION OF CREDIT CARD TRANSACTIONS

(75) Inventors: Michael Wayne Brown, Georgetown, TX (US); Rabindranath Dutta, Los Angeles, CA (US); Michael A. Paolini, Round Rock, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/062,347

(22) Filed: Jan. 31, 2002

(65) Prior Publication Data

US 2003/0141362 A1 Jul. 31, 2003

(51) Int. Cl.[7] .................................................. G06K 5/00
(52) U.S. Cl. ....................................... 235/380; 235/382
(58) Field of Search ................................ 235/379, 380, 235/382; 705/16, 17, 18

(56) References Cited

U.S. PATENT DOCUMENTS

| 4,347,501 A |   | 8/1982  | Akerberg |
|---|---|---|---|
| 4,675,815 A | * | 6/1987  | Kuroki et al. ................. 379/37 |
| 5,239,583 A | * | 8/1993  | Parrillo ......................... 705/72 |
| 5,354,974 A |   | 10/1994 | Eisenberg |
| 5,598,151 A | * | 1/1997  | Torii, Jr. ..................... 340/5.33 |
| 5,731,575 A |   | 3/1998  | Zingher et al. |
| 6,068,184 A | * | 5/2000  | Barnett ........................ 235/379 |
| 6,550,671 B1 | * | 4/2003 | Brown et al. ................ 235/379 |

\* cited by examiner

*Primary Examiner*—Thien M. Le
*Assistant Examiner*—Lisa M. Caputo
(74) *Attorney, Agent, or Firm*—Cynthia S. Byrd; Streets & Steele; Jeffrey L. Streets

(57) ABSTRACT

A method, computer program and system for alerting authorities during a transaction card authorization process, that a crime is in progress without alerting the perpetrator that an alert has been given. During a transaction card authorization process, the vendor attaches a code to the vendor identification sent to the authorization center. The code may be a normal code or a duress code. In either situation, the entered code is compared to the stored duress code. If a duress code has been entered, then the authorities are notified and the account transaction is approved, although at a slower rate than normal to provide authorities time to respond. Any attempt to contact the person under duress is delayed to avoid tipping off the perpetrator that an alarm has been sent.

24 Claims, 2 Drawing Sheets

SECURITY SYSTEM FOR VALIDATION OF CREDIT CARD TRANSACTIONS

BACKGROUND OF THE INVENTION

1. Field of the Invention

The present invention relates to methods and systems for operating a credit card validation system.

2. Description of the Related Art

Transaction cards, such as a credit cards, debit cards, or prepaid cards, have become a common instrument for the purchasing of a wide variety of goods and service. When a holder of a transaction card presents the card to a merchant in order to purchase goods, services or distribution of currency, some form of authorization by the card issuer is sought by the merchant in order to minimize theft and risk of loss to the merchant. For this purpose, electronic authorization networks have been developed wherein a merchant uses a terminal to read account information encoded on a magnetic strip located on the back of the transaction card. The terminal then automatically calls a central processor, operated by the network, that analyzes the authorization request. The call from the terminal is typically routed through a local financial institution or transaction card issuer. Normally, the card reader appends a vendor code to the account information during each transaction, wherein the vendor code identifies the business so that proper credit for the transaction maybe given to the correct business. A sales clerk or other vendor employee may also provide information to be transmitted to the central processor, such as the last four digits of the account number and the amount of the purchase.

Along with the increased use of transaction cards, there has been an increase in the amount of improper use of transaction cards. However, many of the methods used to reduce or prevent improper use of these cards require some type of verification that the card holder or user is an authorized user, for example by requiring the entry of a secret personal identification number (PIN).

Methods requiring this type of verification from the card holder, while being effective in preventing use of stolen transaction cards, have inadvertently led perpetrators to force authorized users to provide such verification under threat of harm. Essentially, these methods reduce transaction card theft at the expense of the card holder's safety.

Furthermore, even if the authorized user is not herself being threatened, conditions may exist that cause a store clerk to be afraid of confronting an unauthorized user by refusing a proposed transaction. Under such a real or perceived threat of harm, the unauthorized transaction may be prevented at the expense of the store clerk's safety.

Therefore, there is a need for a method or system that would allow a store clerk to notify authorities of a possible fraudulent or coerced use of a transaction card. It would be desirable if the method or system would notify authorities without such notification being detectable to a perpetrator.

SUMMARY OF THE INVENTION

The present invention provides a method, computer program product, and system for alerting authorities during a transaction card authorization process whenever the vendor suspects the transaction maybe criminal and is fearful of accusing the suspect or asking the suspect to surrender the card. The method comprises receiving a vendor code from the vendor, with each vendor request for transaction card authorization, wherein the vendor code selectively includes either a duress code or a normal code. Authorities are then notified of a suspected crime in progress if the vendor code includes the duress code. The duress code may include one or more alphanumeric characters added to the beginning or end of the vendor code, where each of the one or more alphanumeric characters is pre-determined to be the duress code. If the vendor suspects that the account transaction is criminal, then the vendor enters the duress code. If the transaction appears normal, then the vendor enters alphanumeric characters other than those of the duress code to indicate the transaction is a normal transaction. Alternatively, the duress code may be an entirely different code, independent from the normal vendor code.

It is anticipated that the vendor would enter the duress code whenever the vendor suspects a transaction card used in the account transaction is stolen, the vendor suspects a debit card used in the account transaction is stolen, the vendor is under a threat to proceed with the transaction, a customer is under a threat to proceed with the transaction, or combinations thereof.

When the authorization computer receives the account approval request from the vendor, the request will always contain the vendor code for identification of the vendor. In many cases, the vendor code is programmed into the card reader so that the vendor code may be automatically transmitted as part of all account approval requests without manual entry. Depending upon the sophistication of the vendor's system, the amount of the proposed transaction may either be manually entered or automatically uploaded from a cash register for inclusion in the account approval request. Finally, the account approval request will also include either the normal code or the duress code.

Upon receiving the request from the vendor, the authorization computer will retrieve a vendor record from a verification database, wherein the stored duress code is contained in the vendor record. The authorization computer then compares the code received with the stored duress code, and notifies the authorities if the sent code matches the stored duress code. The authorization computer notifies the authorities by means selected from a telephone call using an interactive voice response system, a computer network connection displaying the notification on a display screen, or combinations thereof.

The step of notifying authorities further comprises retrieving a vendor record from a verification database, wherein contact numbers for the relevant authorities are contained in the vendor record. The authorization computer then uses the contact numbers to call the authorities and provide the authorities with the name and address of the vendor and alert the authorities of a possible crime in progress at the address of the vendor.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

The present invention provides a method for using a security system or other electronic device in a manner that provides an outward appearance of a typical use of the security system or other electronic device, but in reality is being used to notify authorities of a crime in progress. More specifically, the present invention provides for using an alternate code, or duress code, to replace a code that must normally be entered into a security system or other type of device. The duress code may then initiate actions beyond the typical use of the device, such as alerting authorities of a crime in progress. It is an advantage that the method initiates these actions without alerting the criminal or suspect that additional steps are being taken, thus protecting a user or vendor from a possible violent outburst during an attempt to summon help. When the user or vendor enters the duress code, the criminal or suspect will believe that the entered code is a normally entered code and not realize or be able to detect that the entered code is a duress code. All responses to the entered duress code, as far as the victim and criminal or suspect can immediately observe, appear to be as if the normal code was entered.

Figure 1:
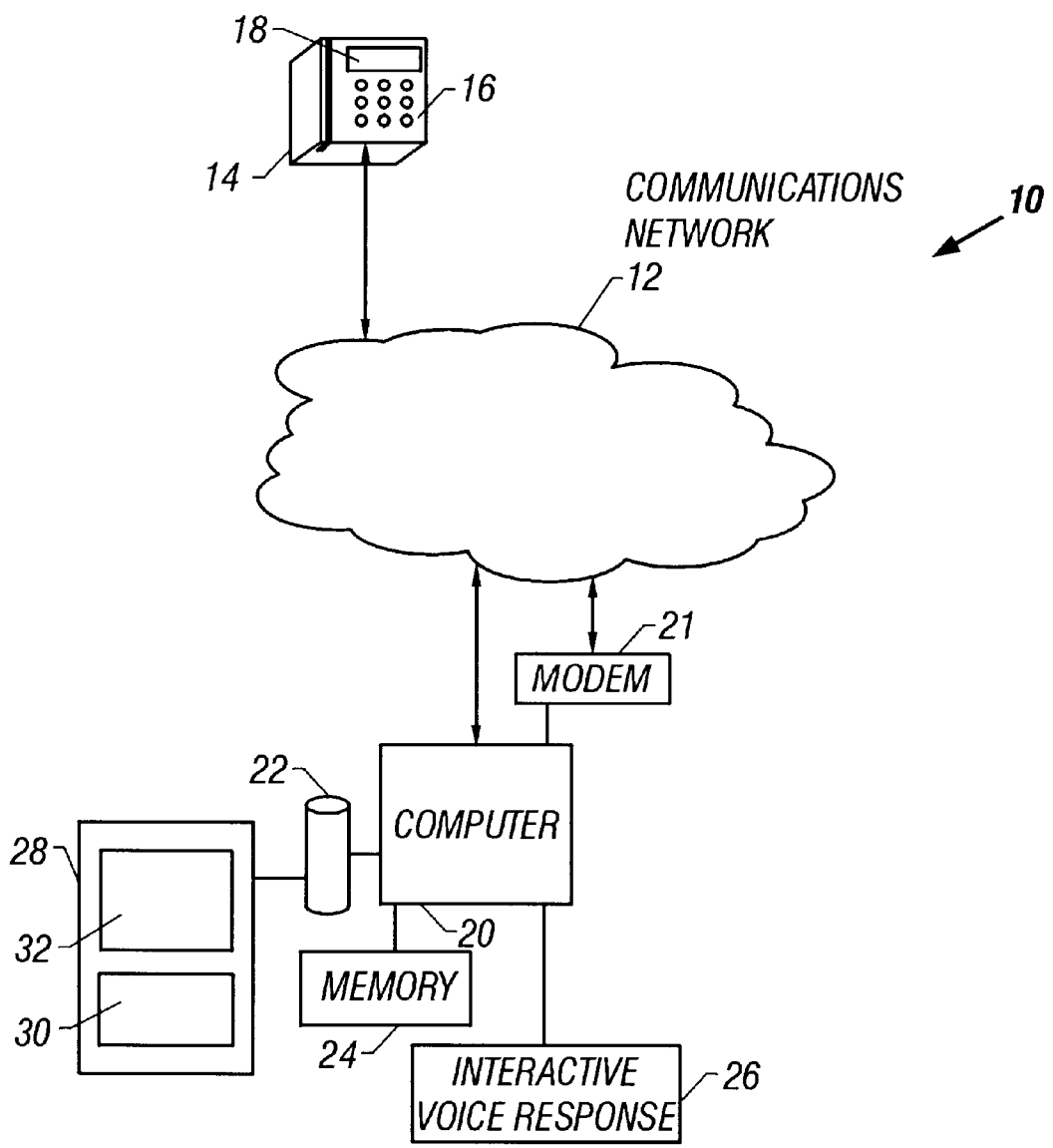
FIG. 1 is a schematic of a system that may be used to implement the present invention.

FIG. 1 illustrates a system 10 that may be used to implement the present invention. When a user decides to purchase goods or services with a transaction card, the user "swipes" the card or presents the card to the vendor who "swipes" the card through a card reader 14 to read the transaction card number, for example, off the magnetic strip on the back of the card. Then as prompted through display 18, the clerk enters a confirmation code using the keypad 16 on the card reader 14. Sometimes the clerk must also enter a code indicating whether the transaction is a final transaction or merely a request for pre-approval of an amount for a future transaction. The clerk also usually must enter an amount for the pending transaction. An automatic dialing unit included in the card reader 14 dials a telephone number associated with the card issuer, or other authorization service provider, and connects, through a modem 21, for example, to the authorization computer 20 through a communications network 12. The communications network 12 may include permanent connections, such as wire or fiber optics cables, or temporary connections made through telephone or wireless communications. Furthermore, the system 10 may include the Internet, representing a worldwide collection of net-works and gateways that use the TCP/IP suite of protocols to communicate with one another. The system 10 may also utilize a number of different types of networks, such as, for example, an intranet, a local area network (LAN), a wide area network (WAN), or a wireless network. It should be noted that the system 10 might include additional servers, clients, routers and other devices not shown.

The authorization computer 20 contains a validation database 28 that stores information used in the authorization process. Alternatively, the authorization computer may be one or more mainframe computers, servers, personal computers, or any computer or group of computers having a processor and sufficient memory to store the validation database 28, or combinations thereof. It will be appreciated from the description below that the present invention maybe implemented in software that is stored as executable instructions on a computer readable medium on the authorization computer's system, such as a mass storage device 22 or in memory (RAM) 24. The computer readable medium must also include an operating system program and application programs. As a further alternative, the authorization computer may be a part of an account verification service provider that may connect to another authorization computer or processor of the card issuer that then provides the verification database for a given cardholder.

Records for each cardholder and vendor are maintained in the verification database 28. A typical vendor record 32 may contain information consisting of, for example, the vendor code that is transmitted with the transaction card number requiring authorization, a name and address of the vendor, vendor preferences and a business type.

After the authorization computer has received the authorization request message from the vendor, the authorization computer searches the verification database 28 for the transaction card number and retrieves the cardholder record 30 associated with that transaction card number. The server also searches for the vendor record 32 associated with the vendor code contained in the authorization request message.

Because the authorization computer uses the vendor code to look up the vendor record and to credit the vendor's account with the transaction, that portion of the account approval request used by the authorization computer to identify the vendor will preferably remain unchanged. However, alphanumeric characters maybe added to the request in the form of a "confirmation" code and the content of the confirmation code may be changed under duress conditions without affecting the capability of the authorization computer to determine the vendor from the vendor code. The normal confirmation code may include (or "confirm") the last four digits of the card account number. The duress confirmation code may include a predetermined 4-digit code and alert the authorization computer to a duress condition. Alternatively, the duress confirmation code maybe entered by adding at least one pre-determined digit before the confirmation code, adding at least one pre-determined digit after the confirmation code, or combinations thereof. For example, if the normal confirmation code requires a 4-digit number to confirm the account, then a 5-digit number may be entered, such that the authorization computer only looks at the first 4 numbers to confirm the account, and looking at the fifth digit to determine whether a duress condition exists. By entering a pre-determined number as the last digit, for example a 9, the authorization computer can detect whether a duress condition exists. Entering any number other than a 9 would be considered by the authorization computer to be a normal condition. It is important to always enter the same number of alphanumeric characters so that a knowledgeable suspect will not be alerted to the duress code if an additional digit is added during the suspected transaction. Upon receiving the duress code, the authorization computer contacts the authorities, a security service provider, a manager or combinations thereof at a telephone number or numbers recorded in the vendor preferences on the verification database.

Communication among the authorities, security service provider and/or manager of the vendor company and the authorization computer may be through recorded messages spoken over a telephone system from the computer or messages displayed on a screen 18. Preferably, an Interactive Voice Response System (IVRS) 26 is used for communication over a telephone system to a wireless or line based telephone of the authorities. Specifically, IVRS is an application program that may be run on the authorization computer that executes text-to-speech synthesis programmed instructions using ASCII input to generate a read aloud audio rendition of that ASCII input in a machine synthesized voice. Therefore, for example, after retrieving the vendor's name, address, and business type from the verification database and the dollar amount of the pending transaction from the request for authorization message, the IVRS may insert this information in a pre-set format for conveying this information through voice synthesized audio to the authorities, security service provider and/or vendor manager. Also included in the IVRS 26 is a means to respond to touch-tone commands that may be given by the authorities, security service provider and/or vendor manager in response to menu selections presented by the authorization computer. In particular, IVRS is arranged to translate the Dual Tone Multi-Frequency (DTMF) signals received from the authorities to a machine-readable format that is recognizable by the authorization computer 20. For example, if the authorities want to speak to a person on the site of the authorization computer to gather more information, the authorization computer could prompt the authorities to enter a "1" to be connected to a person for further information or verification. The authorities could then be transferred to such a person if so requested. Entering a "2" for example, may instruct the authorization computer to repeat the message. In either case, whether the duress code or the normal code is provided to the authorization computer, the computer will respond in exactly the same way to the vendor's clerk, for example by authorizing the transaction, so as not to alert the suspect creating the threat.

An advantage of the present invention is that authorities, a private security provider and/or a vendor manager may be notified quickly that a crime may be in progress at the vendor's location and summon help quickly but quietly so as not to alert the suspect.

The authorization server may send the vendor an instruction authorizing the pending account transaction in the duress situation, the approval response being exactly the same as when the normal code is used so as not to alert the suspect exerting the duress. Furthermore, the server may employ a delaying tactic, such as requesting that the card be swiped again, before approving the transaction to provide authorities more time to arrive at the vendor's location before the suspect can flee. Initiating any of these actions, as well as others, may be determined on a vendor by vendor basis, such as through vendor preferences associated with the vendor record 32.

Figure 2:
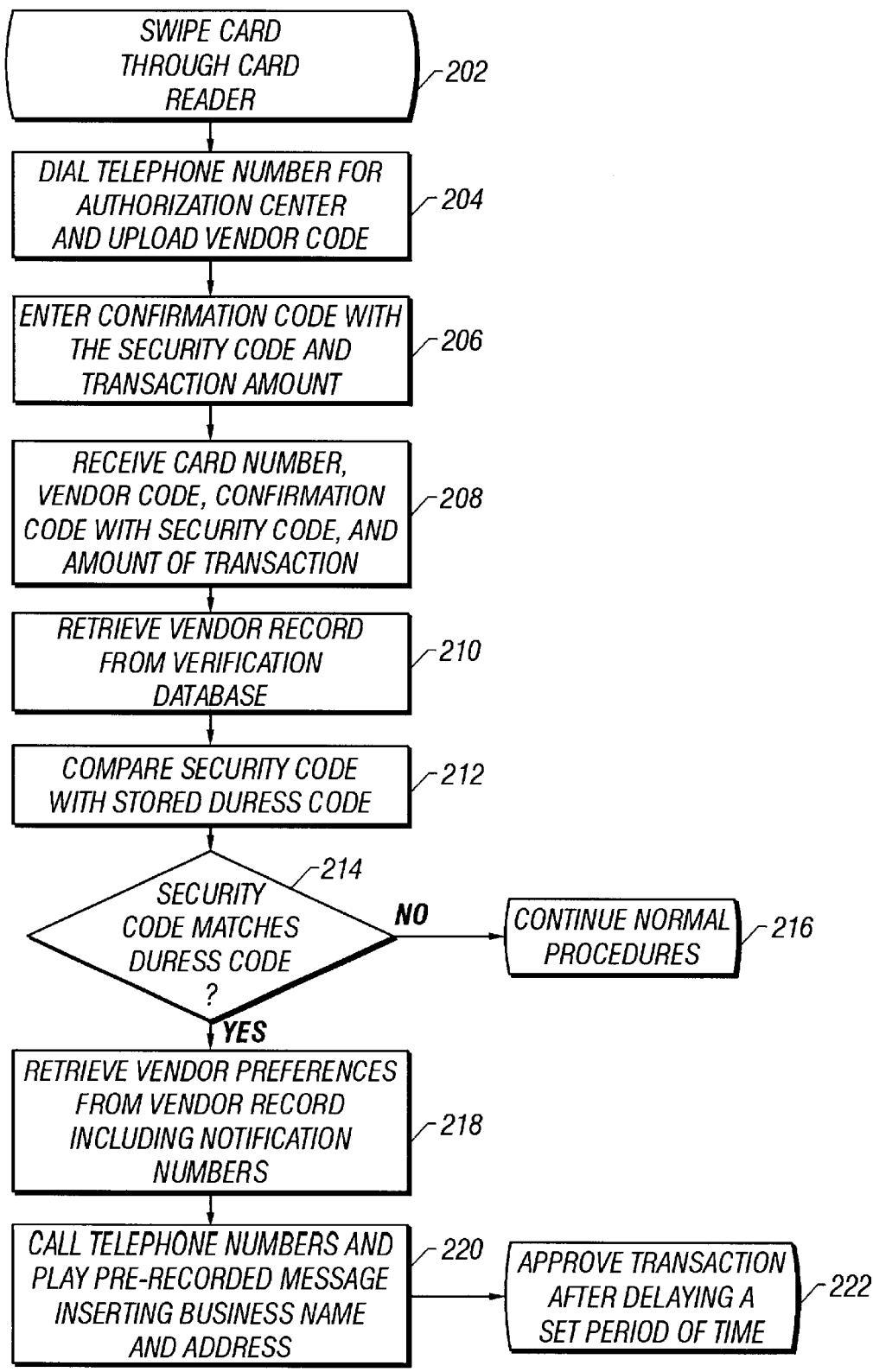
FIG. 2 is a flow chart of a method for alerting authorities during suspected fraudulent use of a transaction card.

FIG. 2 is a flowchart of an embodiment of the invention that maybe implemented on the system shown in FIG. 1. In state 202, the user or a vendor's employee swipes a transaction card through a card reader. In state 204, the automatic dialer attached to the card reader dials the telephone number for the authorization center and uploads the vendor code. In state 206, the clerk enters the security code and the transaction amount. The security code is entered by adding or appending an alphanumeric character to the end of the confirmation code. If under duress, the duress condition may be indicated by entering the security code as a pre-determined character, for example, the digit 9 following entry of the last four digits of the account number. If not under duress, then the security code may be any other character, indicating a duress free condition. Any character entered as the last digit, other than the designated duress character, will signal a non-duress condition. In this example, adding a nine to the end of the confirmation code will signal a duress condition.

In state 208, the authorization computer receives the card number, the vendor code, the confirmation code with the attached security code, and the amount of the transaction as entered by the vendor's clerk. In state 210, the authorization computer retrieves the vendor record from the verification database. In state 212, the authorization computer compares the entered security code with the stored duress code character. If, in state 214, the entered security code does not match the stored duress character, then, in state 216, the authorization computer continues the authorization procedure in a normal manner. If, in state 214, the entered security code matches the stored duress character, then in state 218, the authorization computer retrieves the vendor's preferences from the vendor record.

The vendor's preferences contain instructions for the authorization computer to follow in the event of a duress situation. These instructions may provide telephone numbers for authorities, the employee's manager, a security service, and/or others that the vendor may wish to be notified. The instructions may also instruct the authorization computer to slow the transaction process to allow authorities to respond to the location, to always send an approval instruction for the transaction, to ask for further information to help slow the approval process, and/or other specified instructions the vendor indicates are necessary under a duress condition.

In state 220, the authorization computer continues the authorization process in the normal manner, only at a predetermined slower pace, as instructed in the vendor preferences, to give authorities time to reach the business address before the suspect flees. In state 220, the authorization computer calls those telephone numbers indicated in the vendor's preferences and plays a recorded message to the authorities, inserting the business name and location into the message. In state 222, the authorization computer sends, after the predetermined time delay, an approval authorization message to the vendor's employee, without necessarily checking whether the transaction would be approved under normal circumstances. This helps ensure that the suspect causing the duress receives no indication that a duress code has been entered or otherwise suspect that the authorities have been notified. Alternatively, in state 220, the Interactive Voice Response System (IVRS) 26 may be used to allow the called authorities to interact with the authorization computer to obtain additional information.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for alerting authorities during transaction card authorization comprising:

receiving an authorization request message from a vendor regarding an account of a customer, wherein the authorization request includes a confirmation code of the vendor and wherein the confirmation code entered by the vendor selectively includes either a duress code or a normal code; and notifying authorities of a suspected crime in progress if the confirmation code includes the duress code.

2. The method of claim 1, wherein the duress code is selected from one or more pre-determined alphanumeric characters added to the beginning of the confirmation code and one or more predetermined alphanumeric characters added to the end of the confirmation code.

3. The method of claim 2, further comprising:

entering the duress code whenever the vendor suspects an account transaction to be criminal.

4. The method of claim 3, further comprising:

entering the normal code whenever the vendor does not suspect an account transaction to be criminal, wherein the normal code is any one or more alphanumeric characters other than the pre-determined alphanumeric characters of the duress code.

5. The method of claim 2, wherein the vendor enters the duress code whenever the vendor suspects a transaction card used in the account transaction is stolen, the vendor suspects a debit card used in the account transaction is stolen, the vendor is under a threat to proceed with the transaction, a customer is under a threat to proceed with the transaction, or combinations thereof.

6. The method of claim 1, further comprising:
receiving an account approval request from the vendor, wherein the sent duress code is contained in the confirmation code;
retrieving a vendor record from a verification database, wherein the stored duress code is contained in the vendor record;
comparing the sent duress code with the stored duress code; and
notifying the authorities if the sent duress code matches the stored duress code.

7. The method of claim 6, wherein the authorities are selected from law enforcement, alarm system provider, business manager, private security provider and combinations thereof.

8. The method of claim 6, wherein the notifying means is selected from a telephone call using a recorded message, an interactive voice response system, a computer network connection displaying the notification on a display screen, and combinations thereof.

9. The method of claim 1, wherein the step of notifying authorities further comprises:
retrieving a vendor record from a verification database, wherein contact numbers for the authorities are contained in the vendor record;
calling the contact numbers of the authorities;
providing a name and address of the vendor to the authorities, the name and address of the vendor being contained in the vendor record; and
alerting the authorities of a possible crime in progress at the address of the vendor.

10. The method of claim 1, further comprising:
responding with an approval message in pre-determined extended time frame to provide the authorities time to respond to the notification.

11. A computer program product comprising:
receiving instructions for receiving an authorization request message from a vendor regarding an account of a customer, wherein the authorization request includes a confirmation code of the vendor and wherein the confirmation code entered by the vendor selectively includes either a duress code or a normal code; and
notifying instructions for notifying authorities of a suspected crime in progress if the confirmation code includes the duress code.

12. The computer program product of claim 11, wherein the duress code is selected from one or more alphanumeric characters added to the beginning of the confirmation code and one or more alphanumeric characters added to the end of the confirmation code.

13. The computer program product of claim 12, further comprising:
receiving instructions for receiving the normal code entered by the vendor whenever the vendor does not suspect an account transaction to be criminal, wherein the normal code is any one or more alphanumeric characters other than the pre-determined alphanumeric characters of the duress code.

14. The computer program product of claim 12, wherein the vendor enters the duress code whenever the vendor suspects an account transaction to be criminal.

15. The computer program product of claim 12, wherein the vendor enters the duress code whenever the vendor suspects a transaction card used in the account transaction is stolen, the vendor suspects a debit card used in the account transaction is stolen, the vendor is under a threat to proceed with the transaction, a customer is under a threat to proceed with the transaction, or combinations thereof.

16. The computer program product of claim 11, further comprising:
receiving instructions for receiving an account approval request from the vendor, wherein the sent duress code is contained in the confirmation code;
retrieving instructions for retrieving a vendor record from a verification database, wherein the stored duress code is contained in the vendor record;
comparing instructions for comparing the sent duress code with the stored duress code; and
notifying instructions for notifying the authorities if the sent duress code matches the stored duress code.

17. The computer program product of claim 16, wherein to authorities are selected from law enforcement, alarm system provider, business manager, private security provider, and combinations thereof.

18. The computer program product of claim 16, wherein the notifying instructions are selected from initiating instructions for initiating a telephone call using a recorded message, initiating instructions for initiating a telephone call using an interactive voice response system, initiating instructions for initiating a computer network connection displaying the notification on a display screen, and combinations thereof.

19. The computer program product of claim 11, wherein the notifying instructions for notifying authorities further comprises:
retrieving instructions for retrieving a vendor record from a verification database, wherein contact numbers forte authorities are contained in the vendor record;
calling instructions for calling the contact numbers of the authorities;
providing instructions for providing a name and address of the vendor to the authorities, the name and address of the to vendor being contained in the vendor record; and
alerting instructions for alerting the authorities of a possible crime in progress at the address of the vendor.

20. The computer program product of claim 11, further comprising:
responding instructions for responding with an approval message in a pre-determined extended time frame, wherein the extended time frame provides authorities time to respond to the notification.

21. A system for alerting authorities during an account transaction comprising:
means for receiving an authorization request message from a vendor regarding an account of a customer, wherein the authorization request includes a confirmation code of the vendor and wherein the confirmation code entered by the vendor selectively includes either a duress code or a normal code; and
means for notifying authorities of a suspected crime in progress if the confirmation code includes the duress code.

22. The system of claim 21, further comprising:
means for receiving an account approval request from the vendor, wherein the sent duress code is contained in the confirmation code;
means for retrieving a vendor record from a verification database, wherein the stored duress code is contained in the vendor record;

means for comparing the sent duress code with the stored duress code; and means for notifying the authorities if the sent duress code matches the stored duress code.

23. The system of claim 22, wherein the notifying means is selected from a telephone call using a recorded message, an interactive voice response system, a computer network connection displaying the notification on a display screen, and combinations thereof.

24. The system of claim 21, wherein the step of notifying authorities further comprises:

means for retrieving a vendor record from a verification database, wherein contact numbers for the authorities are contained in the vendor record;

means for calling the contact numbers of the authorities;

means for providing a name and address of the vendor to the authorities, the name and address of the vendor being contained in the vendor record; and means for alerting the authorities of a possible crime in progress at the address of the vendor.

* * * * *